United States Patent [19]

Yonemoto et al.

[11] 4,112,444
[45] Sep. 5, 1978

[54] CAMERA WITH PHOTOFLASH MEANS AND DATA PHOTOGRAPHIC MEANS OPERATED WITH SINGLE BATTERY

[75] Inventors: Tomoo Yonemoto; Yukio Morino; Hiroaki Ishida; Shinji Nagaoka, all of Yotsukaido, Japan

[73] Assignee: Seiko Koki Kabushiki Kaisha, Japan

[21] Appl. No.: 825,400

[22] Filed: Aug. 17, 1977

[30] Foreign Application Priority Data

Aug. 17, 1976 [JP] Japan .................. 51-109784[U]
Aug. 17, 1976 [JP] Japan .................. 51-109785[U]

[51] Int. Cl.² .................. G03B 17/24; G03B 15/03
[52] U.S. Cl. .................. 354/106; 354/145
[58] Field of Search .................. 354/105, 106, 109, 145; 250/476; 355/40

[56] References Cited

U.S. PATENT DOCUMENTS

3,889,281  6/1975  Taguchi et al. .................. 354/105 X

Primary Examiner—Michael L. Gellner
Attorney, Agent, or Firm—Robert E. Burns; Emmanuel J. Lobato; Bruce L. Adams

[57] ABSTRACT

A camera with a photoflash circuit for performing the preparatory operation of charging a main capacitor with high voltage produced by an electrical oscillation circuit and flash operation in synchronization with a shutter exposure operation for the taking of a photograph, a data recorder circuit for recording data such as the date on film under electrical control, both circuits being operated with a single battery, characterized in that when both the photoflash and the data recorder circuits are operated, the terminal voltage of the battery is kept unchanged by interrupting the preparatory operation of the photoflash circuit with an operating signal from the data recorder during its recording operation for recording such data on the film with a proper exposure.

4 Claims, 18 Drawing Figures

CAMERA WITH PHOTOFLASH MEANS AND DATA PHOTOGRAPHIC MEANS OPERATED WITH SINGLE BATTERY

BACKGROUND OF THE INVENTION

This invention relates to a camera for taking photographs by operating photoflash means and data photographic means with a single battery.

As already known, there are cameras provided with means for recording data such as date of photographing other than any object. Pictures can be taken by mounting photoflash means including a battery and being detachable on such cameras for flash photography or recording data.

For cameras incorporating photoflash means may be provided with data recording means, which has a battery and can be mounted on such cameras.

In either case these prior-art cameras are not easy to carry and to operate for taking photographs due to their bulkiness and weight increased by mounting separate photoflash means and/or data recording means. For this reason, it is desirable to make easier maintenance of cameras or change of batteries by reducing the number and type of such batteries and to make less heavy the weight of cameras by making them more compact with such arrangement that at least photoflash means and data recording means can be operated with a single battery for taking photographs. When a camera thus arranged is used for taking a picture by operating both of photoflash means and data recording means, preparatory operation for the next flashing or charging a main capacitor through a step-up circuit is started automatically upon completion of the flash operation of the photoflash means. The terminal voltage of the battery right after the start of charging the capacitor drops suddenly and greatly due to its large electrostatic capacity charged with high voltage produced by oscillating operation. It takes a long time more than 10 seconds before the terminal voltage of the battery is restored after charging is finished. Time required for recording data in the data recording means is set for one-eight second, for instance, which is longer than exposure time, one-thirtieth second, for instance, for flash photography. As a result, even when the data recording means is started prior to the flash operation of the photoflash means, a sudden change may occur in the terminal voltage of the battery, as described above. This causes faulty operation of the data recording means or great reduction in the luminosity of a light emitting member such as a lamp for recording data, and consequently such data cannot be photographed on film with a proper exposure.

SUMMARY OF THE INVENTION

To overcome such drawbacks as described in the camera with photoflash means and data recording means operated with a single unit of battery, the invention provides a camera in which the preparatory operation of photoflash means is delayed with data photographic means during its recording operation.

The camera in which at least the photoflash means and the data photographic means are operated with a single battery is characterized in that the preparatory operation of the photoflash means is interrupted with an operating signal for the data photographic means during its recording operation, in case a picture is taken by operating the photoflash means and the data photographic means, said photoflash means being so arranged as to perform its preparatory operation of charging a main capacitor with high voltage produced in a step-up circuit by electrical oscillation with the battery used as a power source, and its flash operation in synchronization with exposure operation for flash photography, said data photographic means being so arranged as to control its operation for recording data on film with the same battery used as a power source.

The invention is characterized by means for cutting a connection between the battery and the photoflash means with the operating signal for the data photographic means during its recording operation, in case a photograph is taken by operating the photoflash means and the data photographic means.

The invention is characterized by means for stopping the oscillation of the photoflash means with the operating signal for the data photographic means during its recording operation in case a photograph is taken by operating the photoflash means and the data photographic means.

The invention is characterized by means for cutting a connection between the step-up circuit and the main capacitor in the photoflash means with the operating signal for the data photographic means during its recording operation, in case a photograph is taken by operating the photoflash means and the data photographic means.

DESCRIPTION OF EMBODIMENTS

In the drawing, A represents exposure control means for controlling exposure for taking a photograph, B data photographic means, and C photoflash means. A numeral 1 represents a power switch for the exposure control means A, which is closed by depressing a release button (not shown) on a camera; 2 a photoconductive element for controlling exposure time in response to the brightness of any object to be photographed in sunlight; 3 a resistor for compensation for the known characteristics of the photoconductive element; 4 a resistor for controlling exposure time for flash photography; 5 a change-over switch for changing over from the photoconductive element 2 to the resistor 4 and vice versa; 6 a capacitor to form a time constant circuit, which is publicly known, together with the photoconductive element 2 and the resistor 3 of 4; 7 a timing switch for starting the charging of the capacitor 6, said switch being operated by a forerunning member (not shown) to start exposure operation; and 8 and 9 transistors to form a schmitt circuit; 10 an emitter resistance common to the transistors 8 and 9; 11 a collector resistance for the transistor 8; 12 an electromagnet for controlling the operation of a closing member (not shown) to close shutter exposure vanes (not shown) being now opened, so that exposure operation may be finished; 13 and 14 switches for starting the data photographic means, which are operated by the forerunning member and the closing member respectively; 15 a synchroswitch for starting the flush operation of the photoflash means C. These constitute the exposure control means A, which is connected as shown in the drawing.

A numeral 16 represents a power switch for the data photographic means B, which is interconnected to a knob (not shown) and other elements, said knob protruding from the housing of a camera for manual operation by a photographer; 17 and 18 a resistor and a capacitor to form a time constant circuit for controlling time for recording data; 19 a transistor; 20 a lamp for recording data on film; 21 a resistor; 22 snd 24 transistors; 25 an electromagnet controlled by the transistor 24; 26 a reed switch operated electromagnetically by the electromagnet 25; 27 a diode; and 28 a resistor. These constitute the data photographic means B, which is connected as shown in the drawing.

A numeral 29 represents a power switch for the photoflash means C, which is interconnected to a knob (not shown) and other elements, said knob protruding from the camera housing for manual operation by the photographer; 30 a resistor; 31 a capacitor; 32 and 33 transistors; 34 a transformer to form a step-up circuit for raising voltage from a battery by oscillation; 35 a diode for rectifying ac energy the voltage of which is thus increased; 36 a main capacitor for storing high-voltage energy so as to make the camera ready for flash operation; 37 a resistor; 38 a trigger capacitor; 39 a trigger transformer to form a known trigger circuit; 40 a known electro flash tube; 41 a neon tube for indicating completion of the preparatory operation of the photoflash means C for the photographer by lighting when voltage produced across the main capacitor 36 with electric charge has become higher than a specific value; 42 a resistor for bias control of the neon tube 41; and 43 an auxiliary switch for the photoflash means C, which is interconnected to the power switch 16 in the data photographic means B. These constitute the photoflash means C, which is connected as shown in the drawing. A numeral 44 represents a battery for electric supply to the exposure control means A, the data photographic means B, and the photoflash means C.

Now, the operation of the invention will be explained.

First, one embodiment will be described in which when a photograph is taken by operating the photoflash means and the data photographic means, the photoflash means is prevented from being oscillated with an operating signal for the data photographic means, during its recording operation.

Figure 1:
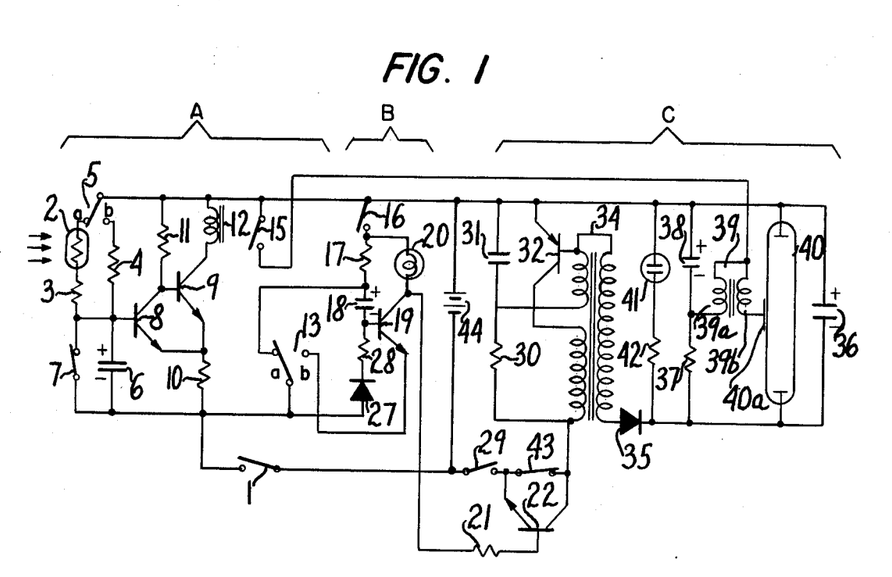
FIGS. 1, 2, and 3 show first, second, and third embodiments of the invention respectively.

FIGS. 1 and 7 show a first embodiment of the invention. In FIG. 1, the power switch 16 in the data photographic means B and the power switch 29 in the photoflash means C are opened manually by a photographer. The change-over switch 5 in the exposure control means A, which is interconnected to the power switch 29, is turned to the side of a contact (a). In other words, preparation for taking a photograph in sunlight is indicated without operation of the data photographic means B and the photoflash means C. Under this condition, when a release button (not shown) is depressed, the power switch 1 in the exposure control means A is closed to operate the transistor 9, and the electromagnet 12 is excited. By depressing the release button farther, the forerunning member (not shown) to start the opening of shutter exposure vanes (not shown) is operated with energy stored in a spring or the like. The forerunning member opens the timing switch 7, and operates an opening member (not shown) to actuate the exposure vanes so as to open a shutter (not shown). When the timing switch 7 is opened, charging the capacitor 6 starts with such polarity as shown through the photoconductive element 2, the resistance of which responds to the brightness of any object to be photographed, and the resistor 3. Voltage produced with such charge across the capacitor 6 reaches a given level after a lapse of time in response to the brightness of the object, when the transistor 8 is turned into its operating state, while the transistor 9 is turned into its cut-off state. When the transistor 9 is turned cut off, the electromagnet 12 is deenergized, and a control member (not shown) holding an iron piece (not shown) attracted to the electromagnet 12 is separated therefrom to release the closing member (not shown) to close the exposure vanes from locking. Thus, the exposure vanes are closed, and exposure operation is finished. The opening member and the closing member are returned to their positions for storing energy by the forerunning member moved to its position for storing energy in conjunction with the winding up of a roll of film to be made after the exposure operation. At the same time the timing switch 7 is closed to discharge the capacitor 6 so that a person can be ready to take the next photograph.

Now, the operation of the invention will be described for taking a photograph in sunlight by operating the data photographic means alone. The exposure control means A controls exposure operation in a similar manner by depressing the release button after the closing of the power switch 16 in the data photographic means. The forerunning member opens the timing switch 7, and simultaneously turns the switch 13 from the contact (a) to (b), which starts the data photographic means B. When the switch 13 is turned to the contact (b), current flows through the base of the transistor 19 and the resistor 17 in the data photographic means B, charging the capacitor 18, and the lamp 20 is put on with current flowing through the collector of the same transistor. Data elements such as numerals, characters, and symbols on a data member (not shown) on which light is thrown from the lamp 20 are projected and recorded on film through any optical system or the like (not shown) composed of lenses and prisms. Where their transmitting or reflected light may pass. After a lapse of time for recording such data, the capacitor 18 is charged with a given quantity of electricity. Consequently, the transistor 19 is turned cut off, and the lamp 10 is put off. Data photographic operation is then finished. Time for recording data on film with a proper exposure depends on the luminosity of the lamp, the transmittivity or reflection factor of the optical system, and the sensitivity of film. It is normally adjusted for about one-eighth second. When the forerunning member is moved to its position for storing energy by winding up a roll of film after completion of the exposure and data recording operation, the switch 13 is returned to the contact (a). As a result, the capacitor 18 is discharged through a closed circuit of capacitor 18, switch 13, diode 27, and resistor 28. The camera is now set ready for the next data recording operation.

Figure 7A:
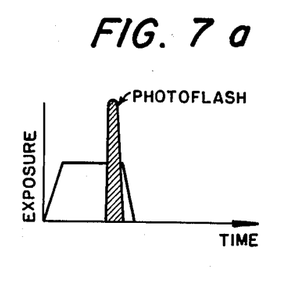
FIGS. 7a to 7d are diagrams showing the operation of the first and fifth embodiments.

Now, the operation of the invention will be described for flash photography by operating the photoflash means C alone. When the power switch 16 in the data photographic means B is opened, the auxiliary switch 43 in the photo flash means C is closed. When the power switch in the photoflash means C is closed, the switch 5 in the exposure control means A is turned to the contact (b), said switch being interconnected to the power switch 29. The main capacitor 36 and the trigger capacitor 38 are charged with such polarity as shown with high voltage produced by oscillation in the photoflash means C. With the release button depressed after the preparatory operation of lighting the neon 41, the exposure control means A controls the exposure operation of the shutter so as to adjust exposure time for flash photography for one-thirtieth second, for instance, likewise in the foregoing processes. The synchro-switch 15 in this case is closed right before the exposure vanes being now opened are closed by the closing member. When the synchro-switch 15 is closed, the trigger capacitor 38 is quickly discharged through a closed circuit of trigger capacitor 38, synchro-switch 15, primary coil 39 (a) of the trigger transformer 39, and a trigger capacitor 38 so as to generate a pulse in the secondary coil 39 (b) of the of the trigger transformer 39. This pulse is led to the trigger electrode 40a of the electroflash tube 40, which performs flash operation by discharging high-voltage energy stored in the main capacitor 36. Generally there is produced a mechanical delay of two to three m sec. before the closing member starts closing the exposure vanes after closing the synchro-switch 15. Thus, flash operation can be done before exposure operation is finished, as shown in FIG. 7a. The photo flash means C can be made ready for the next flash photography by starting the charging of the main capacitor 36 automatically right after the flash operation of the electro flash tube 40.

Figure 7B:
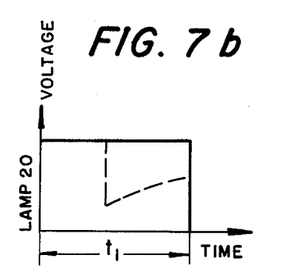
Figure 7C:
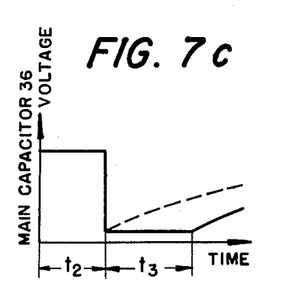
Figure 7D:
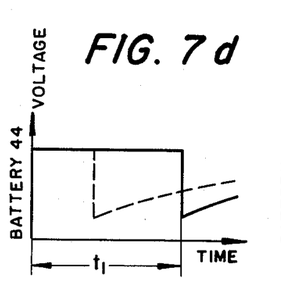

Now, the operation of the invention will be described for flash photography by operating both of the data photographic means B and the photoflash means C. When the power switch 16 is closed in the data photographic means B, the auxiliary switch 43 in the photoflash means C, which is interconnected to the power switch 16, is opened. The change-over switch 5 in the exposure control means A, which is interconnected to the power switch 29, is turned to the contact (b) at the same time. When the release button is depressed after the lighting of the neon tube 41, the timing switch 7 is opened by the forerunning member, and the switch 13 is turned from the contact (a) to (b). The exposure control means A and the data photographic means B start their operation. After a lapse of exposure time for flash photography, the electromagnet 12 is deenergized in the exposure control means A, and the closing member is operated to close the synchro-switch 15. The exposure vanes, which were opened, are closed. The trigger circuit in the photoflash means C is operated likewise as described above by closing the synchro-switch 15. The electroflash tube 40 emits a flash with quick discharge from the main capacitor 38. At this time the data photographic means B is still in operation with its operating time set for one-eighth second for instance, (time tl as indicated in FIG. 7b), which is longer than the exposure time of one-thirtieth second, for instance, for flash photography. As indicated by a broken line in FIG. 7c, charging the main capacitor 36 is automatically started likewise as described above, at the same time when the flash operation of the photoflash means C is finished. The terminal voltage of the battery 44 drops sharply and greatly right after the start of charging the main capacitor because of its large electrostatic capacity of 200 uF, for instance. It will take a long time of about 10 seconds before the voltage thus dropped is restored upon completion of the charging of the main capacitor (or completion of the preparatory operation of the photoflash means). A broken line in FIG. 7d indicates how the terminal voltage of the battery 44 varies. The operation of the exposure control means A, as already described, is finished before the flash operation of the photoflash means C, and consequently, the terminal voltage of the battery 44 is not subject to a sudden change. However, if the data photographic means B now in recording operation is affected directly by such a change, voltage being applied to the lamp 20 is decreased as indicated by a broken line in FIG. 7b with the result of a great decrease in the luminosity. Thus, exposure for data to be recorded becomes extremely insufficient. This drawback can be overcome by the operation of the transistor 22 to be described now. While the data photographic means B is operating to record data, or when the lamp 20 is put on with the transistor 19 operated, the transistor 22 is made inoperative with the base current cut off. As a result, electric supply from the battery 44 to the photoflash means C is suspended, and its oscillating operation stops. The main capacitor 36 cannot be charged so quickly, even when it is discharged likewise through the electroflash tube 40 by closing the synchro-switch 15. Thus, the terminal voltage of the battery 44 is kept unchanged, as indicated by a solid line in FIG. 7d, during the time $t_1$ for recording data by the data photographic means B, while the voltage applied to the lamp 20, as indicated by a solid line in FIG. 7b, is kept constant too. Thus, data can be recorded on film with a proper exposure. When the transistor 19 in the data photographic means B is turned cut off to finish its recording operation, the transistor 22 is restored to its operating state in which the base current flows. Therethrough, power supply from the battery 44 to the photoflash means C is started again, and its oscillating operation is restarted. In other words, time to start charging the main capacitor 36 is delayed by a period of $t3$, as indicated by a solid line in FIG. 7c. As shown in FIG. 7c, time $t2$ is required before the photoflash means C starts flash operation after the suspension of power supply and oscillating operation. As the time $t2$ is a very short time, discharging currents from the main capacitor 36 and the trigger capacitor 38 are so small as negligible. when the power switch 16 in the data photographic means B is opened, the auxiliary switch 43 in the photoflash means C is closed, which is interconnected to the power switch 16. Power can be supplied from the battery 44 to the photoflash means C without through the transistor 22, in case the data photographic means C is not operated.

Figure 2:
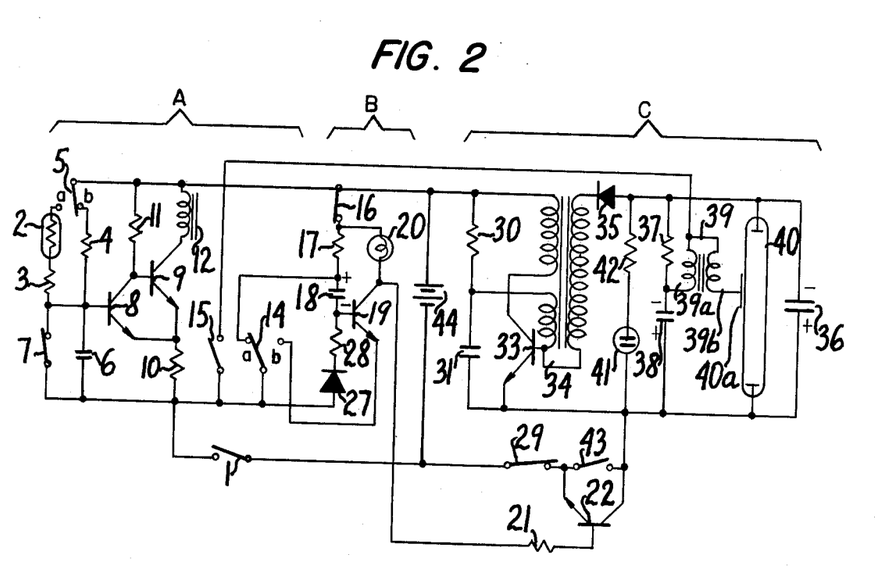

FIGS. 2 and 8 show a second embodiment of the invention. In FIG. 2, the power switch 16 in the data photographic means B is closed, and the auxiliary switch 43 in the photoflash means C is opened, which is interconnected to the power switch 16. The power switch 29 in the photoflash means C is closed, and the change-over switch 5 in the exposure control means A is turned to the contact (b), said switch being interconnected to the power switch 29. The camera is ready for flash photography by operating the data photographic means B and the photoflash means C. This embodiment differs from the first embodiment of the invention shown in FIG. 1 in that the switch 14 for starting the data photographic means B is operated simultaneously with the closing of the synchro-switch 15, and in that the photoflash means C is connected as shown. The main capacitor 36 and the trigger capacitor 38 are charged with such polarity as indicated in the drawing with high voltage produced by the oscillating operation of the photoflash means C. When the release button (not shown) is depressed after completion of the preparatory operation of lighting the neon tube 41, the exposure control means A controls shutter exposure likewise as in the first embodiment. The synchro-switch 15 in this case is closed right before the closing of the exposure vanes, which were opened, by the closing member. When the synchro-switch 15 is closed, the trigger capacitor 38 is discharged quickly through a closed circuit of trigger capacitor 38, transistor 22 now in operation, power switch in the photoflash means C, power switch 1 in the exposure control means A, synchro-switch 15, primary coil 39a of the trigger transformer 39, and trigger capacitor 38. A pulse is generated in the secondary winding 39b of the trigger transformer 39. This pulse is applied to the trigger electrode 40a of the electro flash tube 40, so as to start the discharging of the main capacitor 36 for flash operation. FIG. 8a shows such operation. The switch 14 is turned from the contact (a) to (b) upon the closing of the synchro-switch 15, and the data photographic means B performs recording operation likewise as already described. FIG. 8b shows such operation. While the data photographic means B is operating to record data, or during the lighting of the lamp 20, the transistor 22 is kept cut off to suspend the supply of power from the battery 44 to the photoflash means C. The photoflash means C is prevented from oscillating operation. Thus, the main capacitor 36 is not charged right after its discharge through the electroflash tube 40, as indicated by a solid line in FIG. 8c. The terminal voltage of the battery 44 is kept unchanged, as indicated by a solid line in FIG. 8d, while the voltage applied to the lamp 20 is kept constant, as indicated by a solid line in FIG. 8b. Thus, data can be recorded on film with a proper exposure. When the recording operation of the data photographic means B is finished, or when the transistor 19 is turned cut off likewise as already described, the transistor 22 is restored to its operating state in which the base current flows therethrough. Power supply from the battery 44 to the photoflash means C is restarted, and oscillating operation is resumed. As indicated by a solid line in FIG. 8c, charging the main capacitor 36 is started after a lapse of time t1 for recording data in the data photographic means B. Other operation similar to that in the first embodiment will not be explained here.

Figure 3:
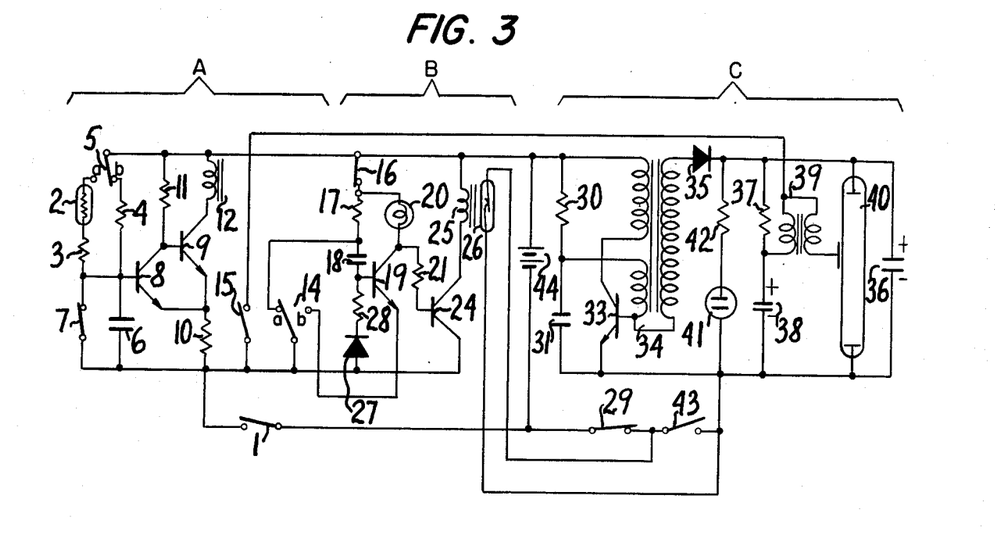

FIG. 3 shows a third embodiment of the invention, in which the camera is ready for flash photography by operating the data photographic means B and the photoflash means C likewise as in FIG. 2. This embodiment differs from the second one in that a reed switch 26 operated electromagnetically is employed as means for interrupting the supply of power from the battery 44 to the photoflash means C during the operation of the data photographic means B. The reed switch 26 is a switch to be operated with magnetic flux produced by the electromagnet 25 when excited. While the data photographic means B is operating to record data, or during the operation of the transistor 19, the transistor 24 is kept cut off so as to deenergize the electromagnet 25. The reed switch 26 is opened with the electromagnet 25 deenergized, and power supply from the battery 44 to the photoflash means C is suspended, and oscillating operation is stopped. Thus, the terminal voltage of the battery 44 is prevented from varying during the recording operation of the data photographic means B, and the luminosity of the lamp can be kept constant in the recording of data. The transistor 19 is turned cut off likewise as already described, and the lamp 20 is put off. Upon completion of recording data, the transistor 24 is restored to its operating state to excite the electromagnet 25. The reed switch 26 is closed to restart the supply of power from the battery 44 to the photoflash means C, and oscillating operation is resumed. Other operation similar to that in the second embodiment will not be explained here.

Figure 9A:
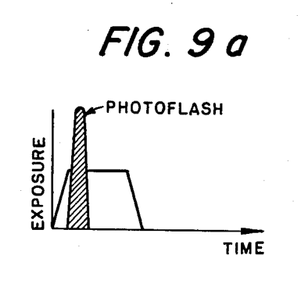
FIGS. 9a to 9d show a fourth embodiment.
Figure 9B:
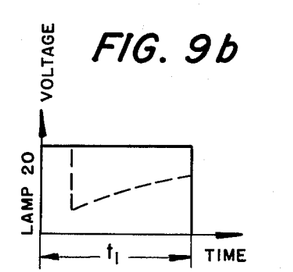
Figure 9C:
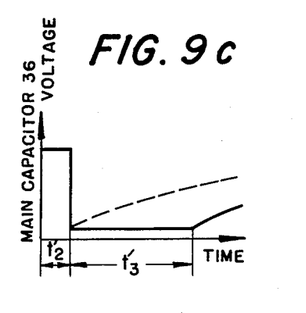
Figure 9D:
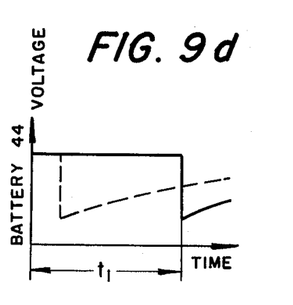

FIG. 9 shows a fourth embodiment of the invention, which differs from the first one in that the synchro-switch for starting the flash operation of the photoflash means C is closed at the initial stage of exposure operation, as indicated in FIG. 9a. Other operation will not be explained here, as it is similar to that in the first embodiment. In this manner it is possible to produce quite the same effect as described above.

In the first and second embodiments, the transistor 22 is employed for suspension of power supply from the battery 44 to the photoflash means C and of its oscillating operation during the recording operation of the data photographic means B. It may be replaced by a SCR (silicon controlled rectifier), which is publicly known. Furthermore, the reed switch 26 employed in the third embodiment may be substituted by a mechanical switch, which is operated by a suitable member controlled by an electromagnet.

Here will be explained another embodiment in which when a photograph is taken by operating the photoflash means and the data photographic means, a connection between the step-up circuit and the main capacitor in the photoflash means is cut with an operating signal for the data photographic means during its recording operation.

Figure 4:
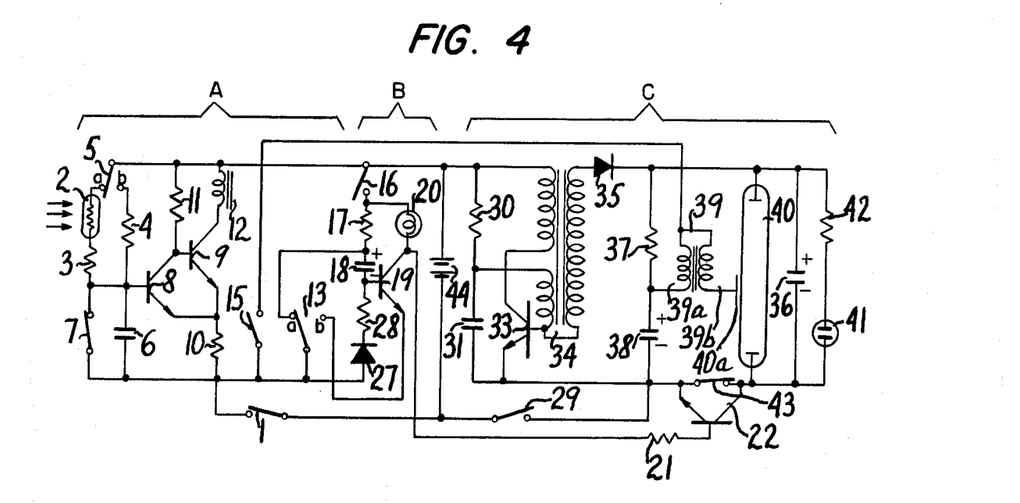
FIGS. 4, 5, and 6 show fifth, sixth, and seventh embodiments.

FIGS. 4 and 7 show a fifth embodiment of the invention.

In FIG. 4, the power switch 16 is closed in the data photographic means B, and the auxiliary switch 43 in the photoflash means C is opened, which is interconnected to the power switch 16. The power switch 29 in the photoflash means C is closed, and the change-over switch 5 in the exposure control means A is turned to the contact (b), said switch being interconnected to the power switch 29. The camera is ready for flash photography by operating the data photographic means B. The operation of the exposure control means A and the data photographic means B is the same as that in the first embodiment shown in FIG. 1. The operation of the exposure control means A and the photoflash means C is similar to that in the second embodiment shown in FIG. 2. Thus, here will be no detailed explanation of such operation. When the release button is depressed after the lighting of the neon tube 41 in the photoflash means C, the forerunning member as already described opens the timing switch 7, and turns the switch 13 from the contact (a) to (b). The exposure control means A starts its operation, and the data photographic means B starts recording operation. After a lapse of time for exposure for flash photography, the electromagnet 12 in the exposure control means A is deenergized to operate the foregoing closing member. The synchro-switch 15 is closed for the closing of the exposure vanes, which were opened. The photoflash means C is operated likewise as already described, by closing the synchro-switch 15, and the main capacitor 36 is discharged quickly to make the electroflash tube 40 flash. At this time the data photographic means B is still in recording operation, as its recording time is set for one-eighth second (time $t1$ as indicated in FIG. 7b), for instance, which is longer than the exposure time of one-thirtieth second, for instance, for flash photography. Upon completion of the flash operation, as indicated by a broken line in FIG. 7c, charging the main capacitor 36 is automatically started likewise as already described. The terminal voltage of the battery 44 drops sharply and greatly right after the start of charging due to the electrostatic capacity of the main capacitor 36, 200 $\mu$F, for instance. On the other hand, it take a long time of about 10 seconds before the terminal voltage thus dropped is restored or charging the main capacitor 36 is finished (that is, the preparatory operation of the photoflash means is finished). A change in the terminal voltage of the battery 44 is indicated by a broken line in FIG. 7d. The operation of the exposure control means A is finished before the flash operation of the photoflash means C, and consequently, the terminal voltage of the battery 44 is not affected by a sudden change. However, if the data photographic means B in recording operation is influenced by a sudden change in the terminal voltage of the battery 44, the voltage applied to the lamp 20 drops as indicated by a broken line in FIG. 7b, with the result of a great decrease in the luminosity. Thus, exposure for data to be recorded becomes extremely low. This disadvantage can be eliminated by the operation of the transistor 22 to be described here. While the data photographic means B is operating to record data, or when the lamp 20 put on with the transistor 19 operated the base current of the transistor 22 is cut, and the transistor 22 is turned cut off. As a result, charging current from the step-up circuit in the photoflash means C to the main capacitor is prevented from flowing. Thus, the main capacitor 36 is not charged so quickly even when it is discharged through the electroflash tube 40 by the closing of the synchro-switch 15, as described above. The terminal voltage of the battery 44 is kept unchanged during time t1 for recording data in the data photographic means B, as indicated by a solid line in FIG. 7d. In this manner, data can be recorded on film with a proper exposure. When the recording operation is finished by turning the transistor 19 cut off, the transistor 22 is restored to it operating state in which the base current flows therethrough, and charging the main capacitor 36 in the photoflash means C is started through the transistor 22. In other words, charging the main capacitor 36 is delayed by time $t3$, as indicated by a solid line in FIG. 7c. Time $t2$ is required before flash operation is started after the cutting of a path between the step-up circuit and the main capacitor 36 in the photoflash means C. The time is extremely short and discharging currents from the main capacitor 36 and the trigger capacitor 38 in this period are so small as negligible. When the power switch 16 is opened in the data photographic means B, the switch 41 is closed in the photoflash means C, said switch being interconnected to the power switch 16. In case the data photographic means B is not operated, power can be supplied directly to the photoflash means C without through the transistor 22. It is also possible to close the synchro-switch for starting the flash operation of the photoflash means C at the initial stage of exposure operation, as indicated in FIG. 9a. Other operation similar to that in the first embodiment will not be explained here. In this manner the same effect as already described can be obtained.

Figure 5:
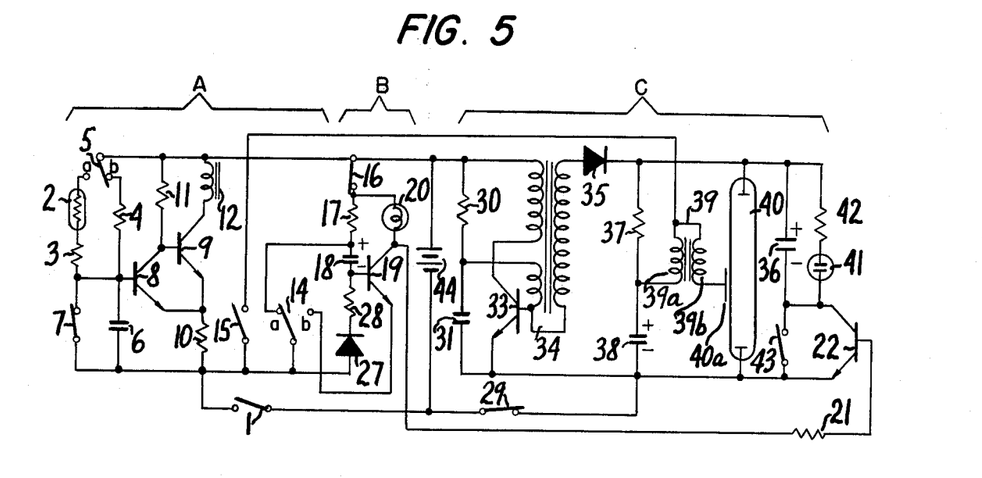
Figure 6:
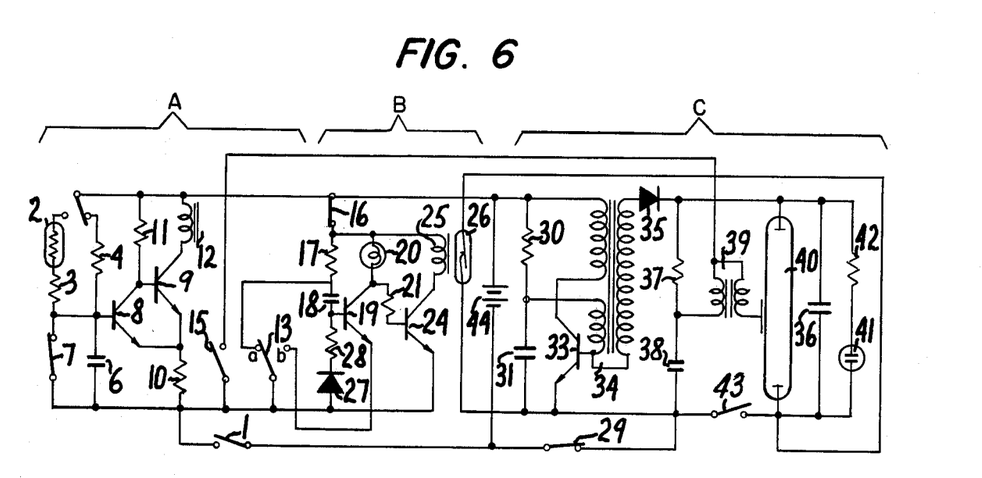

FIGS. 5 and 8 show a sixth embodiment of the invention. FIG. 6 shows a circuit ready for flash photography by operating the data photographic means B and the photoflash means C, likewise as in the preceding embodiment. The embodiment differs from the fifth one shown in FIG. 4 in that the switch 14 for starting the data photographic means B is closed simultaneously with the closing of the synchro-switch 15, and in that the transistor 22 is provided for cutting and connecting a path between the step-up circuit and the main capacitor 36 in the photoflash means C. The main capacitor 36 and the trigger capacitor 38 are charged with such polarity as shown with high voltage produced by the oscillating operation of the photoflash means C. When the release button (not shown) is depressed after completion of the preparatory operation of lighting the neon tube 41, the exposure control means A controls shutter exposure operation likewise as in the preceding embodiment. The synchro-switch 15 is closed right before the exposure vanes which were opened, are closed by the closing member. The photoflash means C performs flash operation by closing the synchro-switch 15 likewise as in the preceding embodiment. FIG. 8a shows such operation. The switch 14 is turned from the contact (a) to (b) at the same time when the synchro-switch 15 is closed. Recording operation is carried out likewise by the data photographic means B.

Figure 8A:
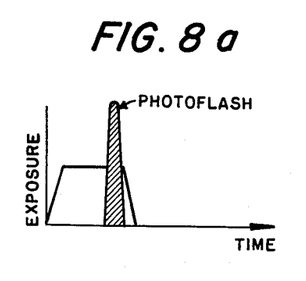
FIGS. 8a to 8d are diagrams showing the operation of the second, third, sixth and seventh embodiments.
Figure 8B:
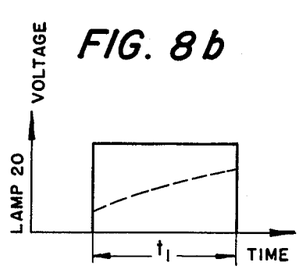
Figure 8C:
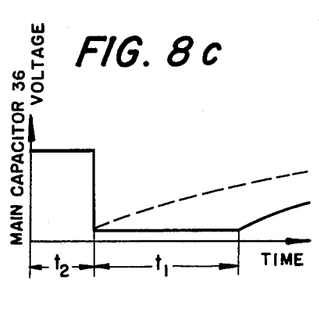
Figure 8D:
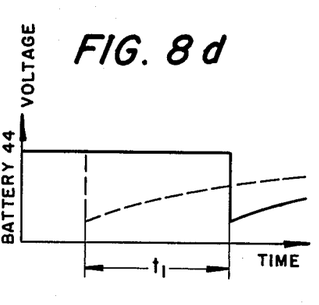

FIG. 8b shows such operation. While the data photographic means B is operating to record data, or when the lamp 20 is put on with the transistor 19 operated, the transistor 22 is turned cut off so as to prevent charging current from flowing from the step-up circuit to the main capacitor 36 in the photoflash means C. In other words, an indicated by a solid line in FIG. 8c, the main capacitor 36 is not charged right after its discharge through the electroflash tube 40. Thus, the terminal voltage of the battery 44 is kept unchanged as indicated by a solid line in FIG. 8d, while the voltage applied to the lamp 20 is kept constant too, as indicated by a solid line in FIG. 8b. Thus, data can be recorded on film with a proper exposure. Upon completion of the recording operation of the data photographic means B or when the transistor 19 is turned cut off likewise as already described, the transistor 22 is restored to its operating state in which the base current flows therethrough. Charging current starts flowing from the step-up circuit to the main capacitor 36 in the photoflash means C through the transistor 22. In other words, as indicated by a solid line in FIG. 8c, charging the main capacitor 36 starts after a lapse of time $t1$ for recording data in the data photographic means B. Other operation similar to that in the preceding embodiment will not be explained here.

FIG. 6 shows a seventh embodiment of the invention. FIG. 6 shows a circuit ready for flash photography by operating the data photographic means B and the photoflash means C likewise as in the preceding embodiment. This embodiment differs from the fifth one shown in FIG. 4 in that a reed switch 26 operated electromagnetically is employed as means for controlling charging current from the step-up circuit to the main capacitor 36 in the photoflash means C. The reed switch 26 is a switch to be closed with magnetic flux to be produced when the electromagnet 25 is energized. While the data photographic means B is operating to record data, or while the transistor 19 is kept in its operating state, the transistor 24 is turned cut off to deenergize the electromagnet 25. The reed switch 26 is opened with the electromagnet 25 deenergized, and charging current from the step-up circuit to the main capacitor 36 in the photoflash means C is suspended. Thus, during the recording operation of the data photographic means B, the terminal voltage of the battery 44 is kept unchanged, and the luminosity of the lamp 20 can be kept constant too. Upon completion of the recording operation with the transistor 19 turned cut off to put off the lamp 20 likewise as already described, the transistor 24 is restored to its operating state to energize the electromagnet 25. The reed switch 26 is closed to allow charging current to flow from the step-up circuit to the main capacitor 36. Other operation similar to that in the preceding embodiment will not be explained here.

In the fifth and sixth embodiments is employed the transistor 22 for cutting the connection between the step-up circuit and the main capacitor 36 in the photoflash means C during the recording operation of the data photographic means B. It may be substituted by a SCR (silicon controlled rectifier), which is widely known. Furthermore, the reed switch 26 used in the seventh embodiment may be substituted practically by a mechanical switch operated by a suitable member, which is controlled by an electromagnet. The operation of the data photographic means B in this invention may be started irrelative to the flash operation of the photoflash means C, with a release member to be operated before or after exposure operation, other than those described in the foregoing embodiments, whereby the same effect can be obtained.

Furthermore, the exposure control means A may be substituted by means including a photoelectric element to control an exposure meter (ammeter); the data photographic means B may be substituted by means having a light shield plate controlled electrically to operate an aperture through which transmitting or reflexted light rays from data elements may pass; or the photoflash means C may be substituted by means for controlling the quantity of flash light automatically in response to a distance to any object to be photographed.

Still furthermore, as readily understood, although the present invention is most suitable for a camera incorporating exposure control means A, data photographic means B, and photoflash means C with a battery 44 for the supply of power to all such means, the invention is also applicable to a camera having exposure control means which is operated with a separate battery, a camera incorporating photoflash means with data photographic means mounted detachably, or a camera designed in a system so that both of data photographic means and photoflash means may be mounted detachably. In brief, it is to be understood that the present invention is not limited in its application to the details illustrated in the foregoing embodiments.

As will be clear from the above description, in a camera for taking a photograph by operating photoflash means and data photographic means to which power is supplied from a single battery, data can be recorded on film with a proper exposure without a change in the terminal voltage in accordance with the invention, in case the photograph is taken by operating the photoflash means and the data photographic means, by stopping the preparatory operation of charging a main capacitor with high voltage for the next flash operation with an operating signal for the data photographic means during its recording operation. In this manner, a camera, small in size and light in weight, can be provided which also is easy to carry and to operate for taking a photograph and which permits a person to take a photograph selectively by operating the photoflash means or by operating the data photographic means or by operating both of the photoflash means and the data photographic means. Furthermore, this camera is easy to maintain and to change for a new battery, because of the use of a single battery of one type.

We claim:

1. A camera with at least photoflash means and data photographic means operated with a single battery, said photoflash means having means for performing its preparatory operation of charging a main capacitor with high voltage produced in a step-up circuit by electrical oscillation with the battery used as a power source and its flash operation in synchronization with exposure operation for flash photography, said data photographic means being so arranged as to electrically control its operation of recording data on film with the same battery used as a power source, said camera comprising means for interrupting the preparatory operation of the photoflash means with an operating signal for the data photographic means during its recording operation, in case a picture is taken by operating the photoflash means and the data photographic means.

2. A camera as claimed in claim 1, wherein means is provided for cutting a connection between the battery and the photoflash means with the operating signal for the data photographic means during its recording operation, in case a picture is taken by operating the photoflash means and the data photographic means.

3. A camera as claimed in claim 1, wherein means is provided for stopping the oscillating operation of the photoflash means with the operating signal for the data photographic means during its recording operation, in case a picture is taken by operating the photoflash means and the data photographic means.

4. A camera as claimed in claim 1 wherein means is provided for cutting a connection between the step-up circuit and the main capacitor in the photoflash means with the operating signal for the data photographic means during its recording operation, in case a picture is taken by operating the photoflash means and the data photographic means.

* * * * *

Notice of Adverse Decision in Interference

In Interference No. 100,329, involving Patent No. 4,112,444, T. Yonemoto, Y. Morino, H. Ishida and S. Nagaoka, CAMERA WITH PHOTOFLASH MEANS AND DATA PHOTOGRAPHIC MEANS OPERATED WITH SINGLE BATTERY, final judgment adverse to the patenteed was rendered Jan. 13, 1981, as to claims 1 and 3.

[*Official Gazette April 14, 1981.*]